May 5, 1931.  F. J. CHAMPLIN  1,804,317
SYSTEM OF ELECTRIC MOTOR CONTROL
Filed Nov. 16, 1928
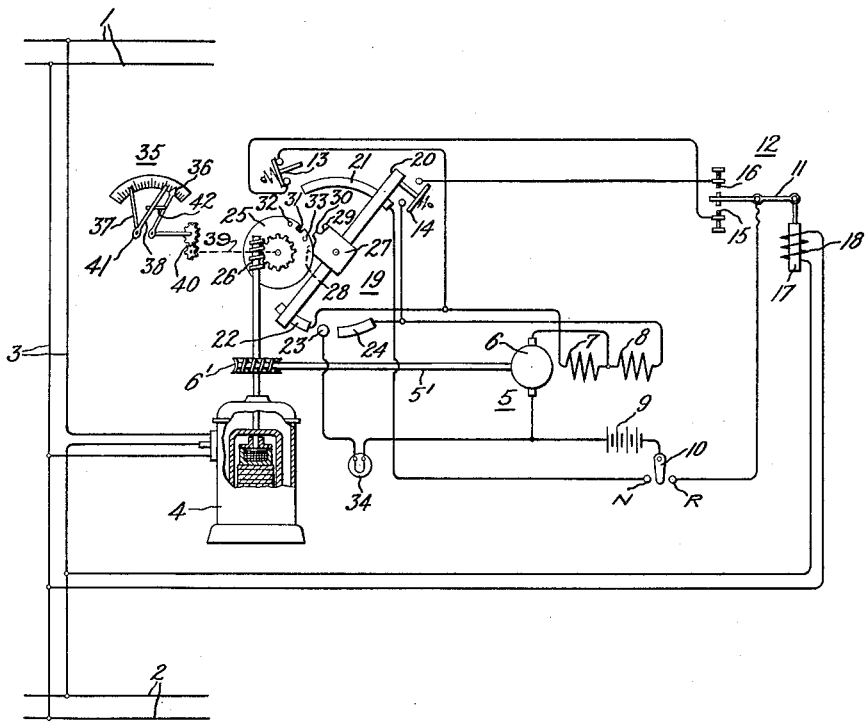
Inventor:
Franklin J. Champlin,
by Charles E. Tullar
His Attorney.

Patented May 5, 1931

1,804,317

UNITED STATES PATENT OFFICE

FRANKLIN J. CHAMPLIN, OF DALTON, MASSACHUSETTS, ASSIGNOR TO GENERAL ELECTRIC COMPANY, A CORPORATION OF NEW YORK

SYSTEM OF ELECTRIC MOTOR CONTROL

Application filed November 16, 1928. Serial No. 319,907.

My invention relates to systems of electric motor control and more particularly to the control of electric motors employed in connection with devices utilized for regulating an electrical characteristic, such as the voltage, of an electric circuit.

In the control of regulating devices which are introduced into an electric circuit and automatically operated by a motor between predetermined limits of travel it is often desirable to move the device automatically to some exact intermediate or neutral position from either end of its travel. For example, in the well known type of induction voltage regulator comprising a stationary member and a rotatable member which is adjusted in position with respect to the stationary member either to increase or decrease the voltage of the circuit with which it is associated, it is usually desirable to move the rotor member to its neutral position before taking the regulator out of service. It is particularly advantageous to place single phase induction regulators in the neutral position for switching because in this type of regulator the only voltage existing in the secondary or series winding when the regulator is in its neutral position is the impedance voltage drop due to the line current flowing through the series winding. The position of the rotor is usually controlled by a motor whose energization and direction of rotation are controlled from an independent circuit by a device connected to be responsive to the voltage of the circuit to be controlled. Various automatic means for controlling the motor when the rotor of the regulator has moved to its extreme regulating position in either direction from a neutral position are well known but when it is desirable to place the rotor in its neutral position the procedure is accompanied by a process of jogging the control motor in one direction or the other about the neutral position until the desired position is obtained. It is often inconvenient or impossible to view the rotor position indicator and as a consequence considerable time and trouble are required to position the rotor in its neutral position when it becomes desirable to do so.

It is an object of my invention to provide an improved system of control for an electric motor normally operated in either direction from a predetermined position and confined in its operation to predetermined limits of travel on each side of said predetermined position whereby said motor may be returned at will to said predetermined point from either side thereof irrespectively of the direction of its departure from said intermediate position.

Another object of my invention is to provide an improved system of control for a motor arranged to actuate an electric regulator normally operated within predetermined limits from a neutral position, whereby said regulator may be moved automatically from either extreme regulating position and selectively stopped at its neutral position. A further object of my invention is to provide an improved arrangement for operating electric regulators having a movable element normally operated within predetermined limits of travel from a neutral position whereby accurate positioning and indication respectively of said movable element in its neutral position is obtained as well as the indication of its position at any operating point at any instant or its maximum travel from neutral in either direction between inspection periods.

My invention will be better understood from the following description taken in connection with the accompanying drawing and its scope will be pointed out in the appended claims.

In the single figure of the accompanying drawing, I have illustrated diagrammatically an embodiment of my invention in a system of control for an induction regulator in a single phase alternating current system but it will be understood that my invention is not limited to this particular application and may be used generally for selectively controlling a motor having its operation confined to predetermined limits in either direction in a manner to move the device controlled by said motor exactly to a neutral position or a predeterminate position intermediate the predetermined limits of its travel.

Referring to the single figure of the drawing, 1 indicates the conductors of a supply circuit which is arranged to supply current to a distribution circuit 2 through feeder conductors 3. Regulating means shown as a single phase induction regulator 4 is connected in the feeder 2. The regulator is provided with a suitable actuating means for moving the movable member of the regulator in either direction. As shown, the regulator 4 is actuated by a reversible motor 5 which is provided with an armature 6 and field windings 7 and 8 and which is arranged to actuate the movable member of the regulator through a shaft 5' and suitable gearing 6'. One brush of the motor 5 is electrically connected in series with a source of current 9 and a switch 10 to a movable lever 11 of an electroresponsive device illustrated as a contact-making voltmeter 12. The other brush of the motor 5 is electrically connected to one terminal of each of the windings 7 and 8 while the other terminals of the windings 7 and 8 are connected through limit switches 13 and 14 respectively to stationary contacts 15 and 16 respectively of the contact-making voltmeter. These stationary contacts are adapted to be engaged by the movable lever 11 which is actuated by a core 17 and an operating winding 18. The operating winding 18 may be connected to be responsive to an electrical characteristic of the distribution circuit 2 or feeder 3 at any point at which it is desired to hold a predetermined value thereof and as shown is connected to be responsive to the voltage in the feeder 3.

It will be apparent that as long as the voltage at the point on the feeder 3 where the coil 18 is connected, remains at a predetermined value, voltmeter 12 will occupy the position shown in the drawing. If the voltage at this point tends to vary from this predetermined value, the movable lever 11 will engage either the stationary contact 15 or the stationary contact 16 depending upon whether the voltage tends to decrease or increase. The engagement of the movable lever 11 with the stationary contact 15 completes the circuit of the armature 6 and the field winding 7 of the motor 5, whereupon the regulator 4 is adjusted in a direction to decrease the voltage impressed upon feeder 3, whereas, if the movable lever 11 engages the stationary contact 16, the circuit through the armature 6 and the field winding 8 of the motor 5 is completed whereupon the regulator 4 is adjusted in a direction to increase the voltage impressed upon feeder 3.

The switch 10 is connected in series with the source 9 and is arranged to have two alternative circuit closing positions, namely N and R, so designated to indicate when the motor is arranged for effecting regulation and when the motor is arranged for moving the regulator to its neutral position. When switch 10 is moved to the position R the motor is controlled in accordance with the sequence of operations outlined above when the motor is under the control of the voltmeter coil 18, but when switch 10 is moved to the position N the control of the motor is effected in accordance with the operation of a switch 19 which is constructed and arranged in accordance with my invention to control the motor so that the regulator is operated to the neutral position or to a predetermined intermediate position irrespectively of the direction in which it was previously moved from the neutral or predetermined intermediate position.

The switch 19 comprises a blade 20 adapted to engage a contact segment 21 throughout the extent of its travel and preferably positioned at one end thereof, and a plurality of contact segments 22, 23 and 24 adapted to be engaged by the opposite extremity of the blade. The arrangement of the blade of the switch and its relation to the contacts is shown in the drawing when the regulator is away from the neutral position. The switch blade 20 is to be moved in accordance with the movement of the rotor of the regulator and for this purpose I have provided a notched disc 25 which is actuated through suitable gearing 26 from the rotor shaft of the regulator. The ratio of the gearing between the contact blade 20 and the rotor of the regulator may be of any suitable value but I have found that a total reduction of 5 to 1 gives very satisfactory results. With this gear ratio, one degree of rotation of the regulator rotor is represented by five degrees movement of the contact blade 20 so that the regulator rotor may be positioned very accurately at its neutral position. The notched disc 25 is arranged to engage a toothed member 27 so that the two members form an intermittent gearing between the regulator rotor and the switch blade. The toothed member 27 may be constructed of any suitable material, preferably an insulating material, and I have found that molded bakelite forms a very satisfactory material. The member 27 may be made in any suitable shape but, as shown, it may conveniently be made substantially rectangular in shape with three projections or teeth 28, 29 and 30 positioned respectively at the two ends and in the center of the face of the member which is arranged to engage with the disc 25. The disc 25 is provided with a notch 31 with which the tooth 30 is adapted to engage and two pins 32 and 33 on either side of the notch which are adapted to engage the teeth 28 and 29. The contact segment 21 of the switch 19 is connected to contact N of switch 10 and depending upon the position of the switch blade is connected to one terminal of the source 9. The contact segments 22 and 24 of the switch 19 are connected respectively to the outside terminals of the field windings 7 and 8 so that when blade 20 is in contact with contact 22 field winding 7 and the armature are in a circuit to be energized, and when blade 20 is in contact with contact 24, field winding 8 and armature 6 are in a circuit to be energized. Contact segment 23 is arranged intermediate contact segments 22 and 24 and are spaced relative thereto so that when the rotor of the regulator occupies its neutral position or its predetermined intermediate position the motor circuit will be interrupted and a circuit will be completed through a signal device, such as the lamp 34, switch blade 20 and the source 9. The contacts 22 and 24 are positioned with respect to the intermediate contact 23 so that there is an overlapping interval during which the motor 5 is energized and the signal device or lamp is energized. The angular range through which the motor circuit is opened is determined by the space between contacts 22 and 24 and the width of the switch blade 20. This angle is preferably made very small in order that the regulator may be placed accurately in its neutral position.

An indicator 35 comprising a main hand 36 and two drag hands 37 and 38 is associated with the disc 25 in order to indicate the position of the rotor at any instant by noting the position of the main hand 36 or the maximum extent of travel from neutral in either direction that the regulator may have assumed between inspection periods. The main hand 36 is mechanically connected to rotate with the disc 25. It is convenient to utilize an extension of the shaft of disc 25 as indicated in the drawing by the dotted line 39 and preferable to actuate hand 36 through suitable reduction gearing 40 in order to reduce the angle of travel of the hand to a value more convenient for indicating purposes. For example, a satisfactory arrangement which has been used in practice utilizes reduction gearing of such a value that the disc 25 makes about 1⅔ revolutions when the regulator travels from limit to limit while the hand 36 only moves through approximately 120 degrees. The drag handle 37 and 38 are frictionally mounted on a separate shaft 41 and in spaced relation from the movable hand 36. The hand 36 is provided with a suitable projection or lug 42 which is adapted to engage either the hand 37 or 38 in moving in one direction or the other from the neutral position.

The operation of the illustrated embodiment of my invention for locating the regulator in its predetermined intermediate or neutral position is substantially as follows: It will be assumed that switch 10 has been moved to engage contact R and that the regulator has been operated to its maximum position in one direction for example, the maximum boosting position in consequence of a decrease in feeder voltage. In its movement to the maximum boosting position the switch blade 20 will be moved over the contact segment 21 and into engagement with the contact segment 22 by reason of the rotation of disc 25 and the engagement of pin 32 with tooth 29 and slot 31 with tooth 30. In its extreme position switch blade 20 is arranged to engage the limit switch 14 to open the circuit to the armature 6 through the contact 16 and the field winding 8. The motor 5 is then brought to rest because of the interruption of its armature and field circuit. If it is desired to bring the rotor of the regulator to its neutral position, switch 10 is moved to engage contact N in order to transfer control from the contact-making voltmeter to the switch 19. A circuit is completed for the armature of motor 6 through field winding 7 so as to effect rotation of the motor in a direction opposite to that previously obtained for moving the regulator to its maximum boosting position. By inspection of the drawing it will be observed that this circuit is energized independently of the position of the voltmeter contacts or the limit switch and hence the motor is energized irrespectively of the condition of the circuit which is being regulated and irrespectively of the position to which the regulator rotor was last moved. Under the present assumed conditions a circuit is completed from one side of the source 9, through switch 10 and contact N, contact segment 21, switch blade 20, contact segment 22, field winding 7, the armature 6 of motor 5, to the other side of the source 9. A circuit through field winding 7 causes the armature of motor 5 to be rotated in a direction opposite to the direction previously assumed and as a consequence disc 25 is rotated in the reverse direction. In rotating in the reversed direction pin 33 strikes tooth 28 and causes the member 27 and consequently switch blade 20 to start to move in a counterclockwise direction when slot 31 engages tooth 30, and then continues the movement in the same direction until switch blade 20 leaves contact 22 and makes contact with segment 23. As soon as switch blade 20 leaves contact 22 the circuit through the motor 5 is interrupted and the motor comes to rest with the rotor of the regulator in its neutral position. In the neutral position the signal device 34 is energized from the source 9 and affords a means for indicating the neutral position in addition to the indicating hand 36. The regulator may now be taken out of service by the usual switching means (not shown) if such action is necessary for purposes of performing switching operations in the feeders or distribution circuit or for any other desired purpose.

If the regulator should have been on the opposite side of neutral from that described it will be obvious that movement of the switch 10 to the contact N will effect movement of the regulator rotor to the neutral position in a manner similar to that described for positioning the rotor when in the maximum boost position.

When it becomes desirable to place the regulator into service all that is necessary is to close the usual main circuit switches and move the switch 10 to its R or regulating position. The control is thereby taken away from the neutral positioning control and the regulator is now under control of the voltmeter again. As soon as the voltmeter indicates the necessity of increasing or decreasing the feeder voltage, the movable lever 11 is actuated to engage either the stationary contact 15 or the stationary contact 16 depending upon whether the voltage is below or above the predetermined normal value and the operation is carried out as previously described when the motor was under the control of the voltmeter.

While I have shown and described a particular embodiment of my invention it will be obvious to those skilled in the art that changes and modifications may be made without departing from my invention and I, therefore, aim in the appended claims to cover all such changes and modifications as fall within the true spirit and scope of my invention.

What I claim as new and desire to secure by Letters Patent of the United States, is:

1. In a control system, an electric motor, means for operating said motor to a position of rest at any point within predetermined limits of travel, and selective means for causing operation of said motor only to a position of rest at a predetermined point intermediate said predetermined limits irrespectively of the direction and extent of its movement from said intermediate position.

2. In a control system, a plurality of independent electric circuits, an electric motor connected to be energized from one of said circuits for controlling an electrical characteristic of another of said circuits, means responsive to said electrical characteristic of said second mentioned circuit for causing operation of said motor within predetermined limits of travel, and means for selectively controlling said motor to stop at a point intermediate said predetermined limits irrespectively of the value of said electrical characteristics of said second mentioned circuit.

3. In a regulating system, an electric circuit, a regulator in said circuit having a rotatable member adapted to be operated between predetermined limits of travel for controlling an electrical characteristic of said circuit, actuating means for said rotatable member, electroresponsive means for controlling the operation of said actuating means to move said rotatable member between said predetermined limits of travel, means actuated in accordance with the movement of said rotatable member for controlling said actuating means to move said rotatable member to a predetermined intermediate position irrespectively of the direction of its departure therefrom, and means for transferring control of said actuating means from said electroresponsive means to said means actuated by said rotatable member for placing said rotatable member in said intermediate position irrespectively of the value of said electrical characteristic.

4. In a regulating system, an electric circuit, a regulator in said circuit having a rotatable member adapted to be operated between predetermined limits of travel for controlling an electrical characteristic of said circuit, actuating means for said rotatable member, electroresponsive means for controlling the operation of said actuating means to move said rotatable member between said predetermined limits of travel, means actuated in accordance with the movement of said rotatable member for controlling said actuating means to move said rotatable member to a predetermined intermediate position irrespectively of the direction of its departure therefrom, means for transferring control of said actuating means from said electroresponsive means to said means actuated by said rotatable member for placing said rotatable member in said intermediate position irrespectively of the value of said electrical characteristic, and means actuated in accordance with the movement of said rotatable member for indicating when said rotatable member occupies said intermediate position.

5. In a regulating system, an electric circuit, a regulator in said circuit having a rotatable member adapted to be operated between predetermined limits of travel for controlling an elctrical characteristic of said circuit, actuating means for said rotatable member, electroresponsive means for controlling the operation of said actuating means to move said rotatable member betwen said predetermined limits of travel, means actuated in accordance with the movement of said rotatable member for controlling said actuating means to move said rotatable member to a predetermined intermediate position irrespectively of the direction of its departure therefrom, means for transferring control of said actuating means from said electroresponsive means to said means actuated by said rotatable member for placing said rotatable member in said intermediate position irrespectively of the value of said electrical characteristic, and a signal circuit connected to be energized when said rotatable member reaches said intermediate position.

6. In a regulating system, an electric circuit, regulating means connected in said circuit and having relatively movable members, an electric motor for effecting operation of the movable member of said regulating means between predetermined limits of travel, electroresponsive means connected to said circuit for operating said motor in one direction or the other in accordance with variations in the voltage of said circuit, and means for disconnecting said motor from the control of said electroresponsive means and for energizing said motor in a manner to operate the movable member of said regulator to its neutral position irrespectively of the direction of its departure from neutral.

7. In a regulating system, an electric circuit, a regulator in said circuit having a rotatable member adapted to be operated in either direction from a neutral position for controlling the voltage of said circuit, a reversible motor for actuating said rotatable member, an electroresponsive means connected to said circuit for controlling said motor in accordance with variations in the voltage of said circuit, switching means for causing said motor to actuate the rotatable member of said regulator toward its neutral position from either extremity of its travel and for interrupting the circuit to said motor when said rotatable member reaches its neutrol position, and means for transferring control of said motor from said electroresponsive means to said switching means for automatically placing the rotatable member of said regulator in its neutral position.

8. In a regulating system, an electric circuit, an induction regulator including a movable element for controlling the voltage of said circuit, a reversible motor for operating said movable element, electroresponsive means connected to said circuit for operating said motor in one direction or the other within predetermined limits of travel in accordance with variations in the voltage of said circuit, a switch arranged to be actuated by said movable element of said regulator and having contacts in circuit with said motor, and means for rendering said electroresponsive means inoperative to control said motor while rendering said switch operative to operate said motor from either extreme limit of its travel to stop at a point intermediate said predetermined limits.

9. In a regulating system, an electric circuit, an induction regulator having relatively movable members and connected in said circuit, a reversible electric motor provided with an excitation circuit for operating the movable member of said regulator, a contact-making voltmeter connected to said electric circuit for controlling said motor in either direction within predetermined limits of travel, a rotatable switch blade provided with two cooperating contacts which are connected respectively to said excitation circuit to effect rotation of said motor in opposite directions, an intermediate contact interposed between said first mentioned contacts and in spaced relation thereto in a manner to interrupt the connections of said switch blade to said excitation circuit, a signal circuit connected to said intermediate contact for indicating when said switch blade is in a position intermediate said two contacts, an intermittent gearing interconnecting the movable member of said regulator and said rotatable switch blade for actuating said blade to a position corresponding to the position of the movable member of said regulator, and means for selectively connecting said contact-making voltmeter or said rotatable switch blade and contacts in a circuit to control said motor.

10. In a regulating system, an electric circuit, an induction regulator having relatively movable members and connected in said circuit, an electric motor provided with two field windings adapted to be energized in opposite directions for operating said motor in opposite directions, a contact-making voltmeter connected to said electric circuit for controlling said motor in either direction, a rotatable switch blade provided with two cooperating contacts which are connected respectively to different field windings to effect rotation of said motor in opposite directions, limit switches actuated by said rotatable switch blade for deenergizing said motor at predetermined extreme limits of travel, a contact interposed between said first mentioned contacts and in spaced relation thereto in a manner to interrupt the connections of said switch blade to either of said field windings, a signal circuit connected to said intermediate contact for indicating when said switch blade is in a position intermediate said two contacts, an indicator comprising an indicating hand and two cooperating hands for indicating the maximum position of said indicating hand in either direction and arranged to operate with said switch blade, an intermittent gearing comprising a notched disc connected to rotate with said regulator and in cooperative relation with a toothed member associated with said switch blade for causing operation of said switch blade in accordance with the operation of said regulator, and a manually operated switch for transferring control from said contact-making voltmeter to said rotatable switch blade.

In witness whereof, I have hereunto set my hand this 14th day of Nov., 1928.

FRANKLIN J. CHAMPLIN.